(12) United States Patent
Lee

(10) Patent No.: US 6,412,218 B2
(45) Date of Patent: *Jul. 2, 2002

(54) PLANTING DEVICE AND SYSTEM AND METHOD OF GROWING PLANTS UTILIZING BAGS OF GROWING MEDIUM

(76) Inventor: Jay H. Lee, 6072 Hwy. 53, Braselton, GA (US) 30517

( * ) Notice: Subject to any disclaimer, the term of this patent is extended or adjusted under 35 U.S.C. 154(b) by 0 days.

This patent is subject to a terminal disclaimer.

(21) Appl. No.: 09/764,719

(22) Filed: Jan. 18, 2001

Related U.S. Application Data

(63) Continuation of application No. 09/243,398, filed on Feb. 1, 1999, now Pat. No. 6,185,864.

(51) Int. Cl.⁷ .............................................. A01G 29/00
(52) U.S. Cl. .................................. 47/48.5; 47/9; 47/47
(58) Field of Search ............................... 47/9, 14, 48.5, 47/65.8, 74, 77, 81; 428/17

(56) References Cited

U.S. PATENT DOCUMENTS

| | | |
|---|---|---|
| 73,442 A | 1/1868 | Fish |
| 1,380,253 A | 5/1921 | Rodger |
| 1,880,136 A | 9/1932 | Hickok |
| 1,936,988 A | 5/1933 | Otwell |
| 1,959,139 A | 5/1934 | Otwell |
| 2,145,934 A | 2/1939 | Kingman |
| 3,914,900 A | 10/1975 | Bigelow et al. |
| 3,962,822 A | 6/1976 | Walters |
| 4,283,445 A | 8/1981 | Bartholl |
| 4,299,056 A | 11/1981 | Towning |
| 4,336,669 A | 6/1982 | Gordon |
| 5,022,182 A | 6/1991 | Anderson |
| 5,081,791 A | 1/1992 | Baron et al. |
| 5,241,783 A | 9/1993 | Krueger |
| 6,185,864 B1 * | 2/2001 | Lee ............................ 47/48.5 |

* cited by examiner

*Primary Examiner*—Charles T. Jordan
*Assistant Examiner*—Judith A. Nelson
(74) *Attorney, Agent, or Firm*—Alston & Bird LLP

(57) ABSTRACT

A novel device, system and method for promoting the growth, development and harvest of desired plants while suppressing the growth of weeds is described. In an exemplary embodiment, the device is a tapered container with an opening at the upper, wider end of the device and an opening at the lower, narrower end of the device. The device also has one or more openings along the surface of the device between the upper end and the lower end. In an exemplary embodiment of the method, a bag of growing medium is placed over the ground and a device is inserted into the bag so that the lower end penetrates both sides of the bag and enters the ground below and the opening at the lower end communicates with the ground. The opening at the upper end of the device should be at or above the upper surface of the bag and at least one or more openings in on the surface of the device should be in communication with the growing medium contained within the bag. Thus, weed growth is suppressed and a plant grown in the device has access to nutrients contained in the bag and the ground below.

10 Claims, 4 Drawing Sheets

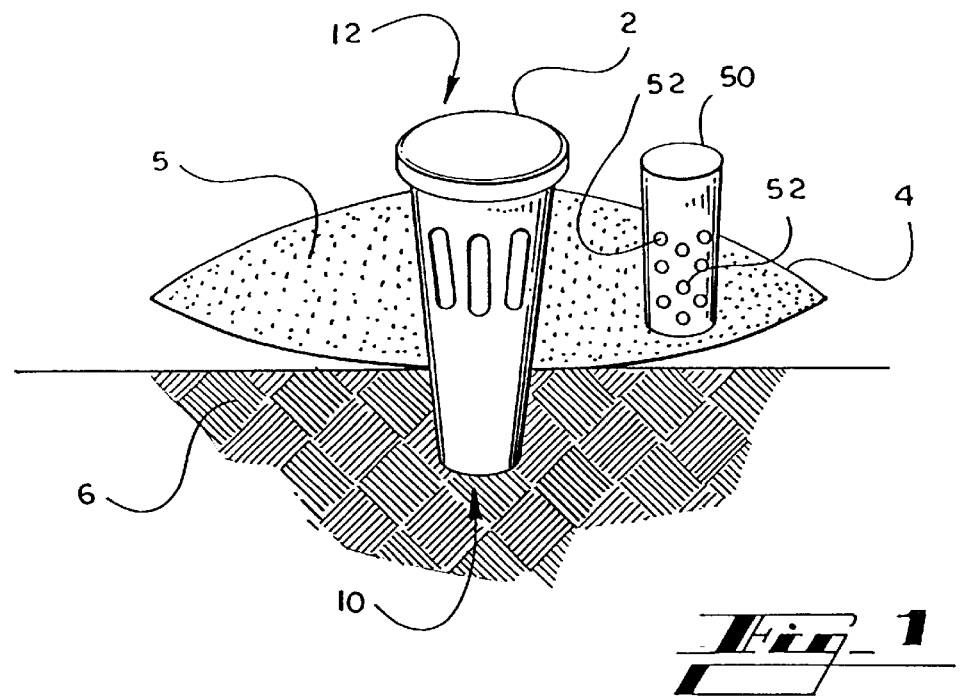
Fig_1
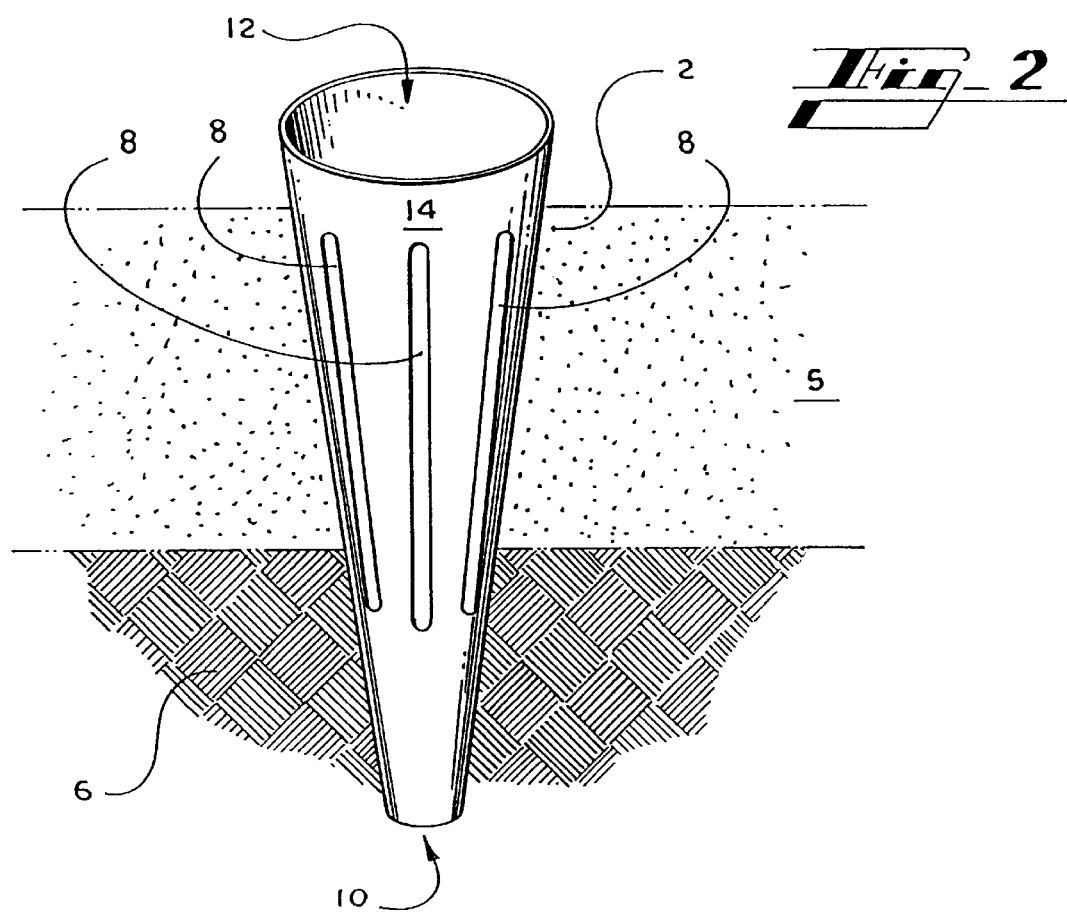
Fig_2

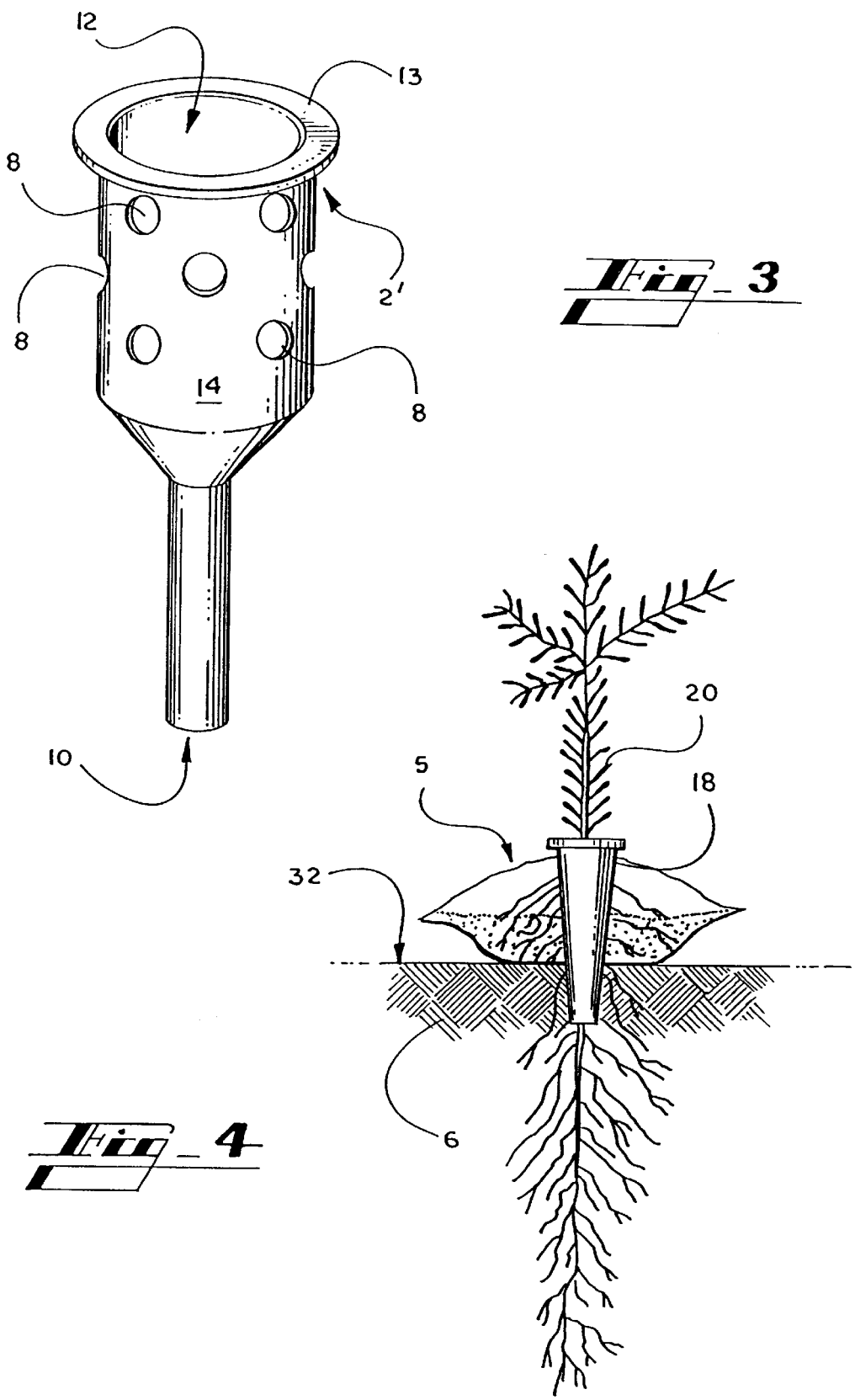

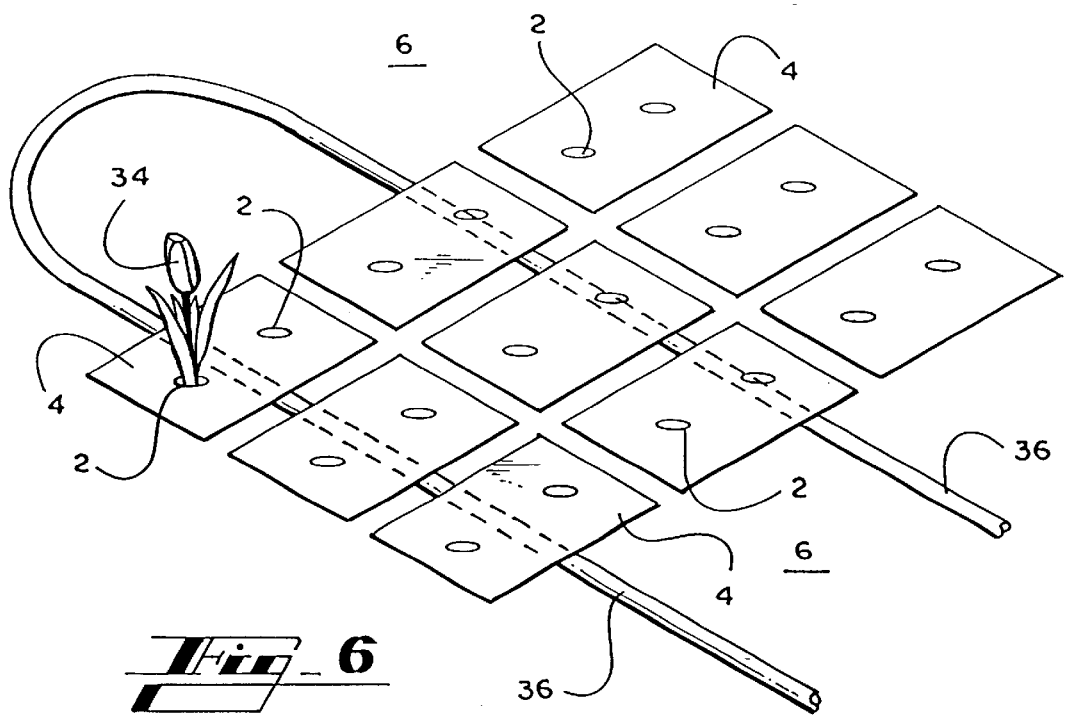
Fig_6
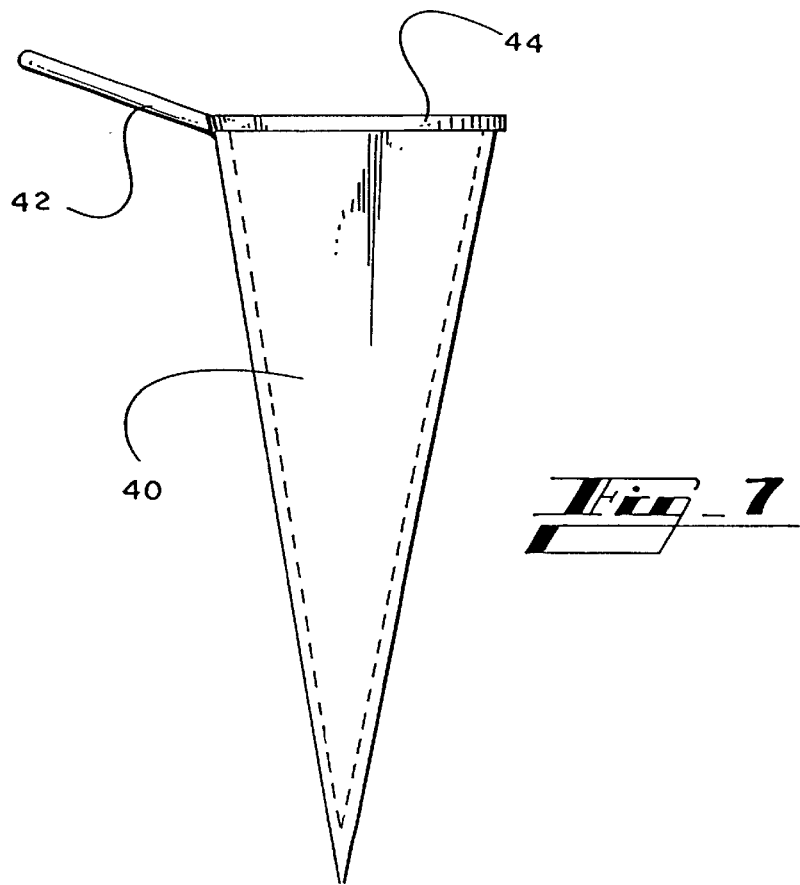
Fig_7

PLANTING DEVICE AND SYSTEM AND METHOD OF GROWING PLANTS UTILIZING BAGS OF GROWING MEDIUM

CROSS REFERENCE TO RELATED APPLICATIONS

This application is a continuation of U.S. application Ser. No. 09/243,398, filed Feb. 1, 1999 now Pat. No. 6,185,864.

FIELD OF THE INVENTION

The present invention relates to a device and a method of horticulture. More particularly, the present invention relates to a novel device for promoting the growth of desired plants and a system and a method of gardening incorporating the device and bags of growing medium.

BACKGROUND OF THE INVENTION

The use of devices to insert plants or seeds into the ground has been practiced since the beginning of agriculture. Devices used to insert seeds and plants in the ground range from devices as simple a stick or a dibble for making an impression in the soil to more complex devices for inserting and containing seeds and seedlings as described in U.S. Pat. Nos. 1,880,136, 1,936,988, 1,959,139, 3,914,900, 3,962,822 and 4,336,669. The devices described in these patents are designed to degrade, decompose or fall apart after burial to allow future growth and expansion of the seed, seedling or plant contained within the devices. The devices are not designed to penetrate both sides of a bag of compost or other growing medium nor do the devices suggest methods of growing plants in bags of growing medium. Further, these devices do not facilitate the harvest of the plant at its maturity.

For example, the device and method described in U.S. Pat. No. 3,914,900 involves placing a sheet of specially formulated material over the bare ground and inserting a specially designed plug for containing a plant through the film and into the earth below. The plug is designed to contain a planting element and growth promoting materials but does not provide room for growing medium and root growth within the plug. In addition, the plug is decomposable or biodegradable and requires an open groove extending the full length of the plug. Decomposable and biodegradable plugs may not be rigid enough to penetrate packed soils and clays and, if they degrade during the growth of the plants, they do not facilitate harvesting and removal of plants from the soil. Furthermore, the full-length groove weakens the degradable plug. Most importantly, the method is not helpful where the native soil is of poor quality and the soil is not arable or beneficial to the growth and development of desirable plants.

One device that is not designed to degrade, decompose or break apart is described in U.S Pat. No. 1,380,253. The device is merely a dibble or rod with a recess near its pointed end and is used to monitor the germination of seeds. The device is not adapted to contain nutrients and to facilitate the eventual harvest of mature plants. Another type of device for planting seeds is described in U.S. Pat. No. 4,283,445. The device described in U.S. Pat. No. 4,283,445 is a mulch blanket made of seeds incorporated in a blanket of straw bound with a water-dispersible polymer binder. The mulch blanket is laid on the bare ground and watered. The mulch blanket is also designed to decompose and does not provide for the cultivation of plants from other than seed. Nor does the device facilitate the eventual harvest of mature plants.

In addition to devices for planting seeds and seedlings, various methods for promoting growth of desired plants and improving yield have been proposed. Methods of horticulture using bags containing a growing medium are described in U.S. Pat. Nos. 4,299,056, 5,022,182, 5,081,791 and 5,241,783. The methods described in these patents require specially designed bags or special moisture absorbing polymers as the growing medium contained within the bags. The methods are essentially self contained and do not provide a means for promoting plant growth outside of the bag. Nor do the methods provide a method of utilizing a conventional plastic bag containing growing medium.

Therefore, there is a need to provide an improved device, system and method for promoting the growth of desired plants that may be used with conventional bags of growing medium to supplement the native soil and that facilitate the eventual harvest and removal of mature plants.

SUMMARY OF THE INVENTION

The present invention includes a device, a system and a method for promoting growth of desired plants. The method and system of the present invention utilize a novel device for promoting growth of a planting element such as a seed, seedling, cutting, tuber or other plant generating material positioned within the device while discouraging growth of weeds and other undesirable plants. The device is generally a conduit for containing and inserting plant generating material, growing medium and optional growth promoting substances into a container of growing medium such as a bag of topsoil. The device promotes root growth of a plant contained within the device into the topsoil contained in the bag into which the device is inserted, as well as into the soil or any other growing medium located below the bag. The device also provides access to water and to nutrients contained within the bag and the soil or other growing medium located below the bag.

Generally, the device is a conduit for promoting the growth of a planting element. In an illustrated embodiment, the device is tapered and comprises one opening at each end and at least one or more passageways on the surface of the device between the two ends of the device. In the method of the invention, a bag or other container of growing medium is placed on the ground or a second growing medium and the device is inserted in the container of growing medium so that the lower end of the device penetrates the container of growing medium and enters the ground or second growing medium below. The upper end of the device is located at or above the surface of the container and one or more passageways are located in the growing medium with the container so that a plant grown in the device has access to the growing medium in the container. The method of the present invention provides for easy method of gardening by eliminating weeding and promoting growth of a plant. In a preferred embodiment, the device may contain fertilizer, soil conditioner, soil modifier and other growth promoting substances.

BRIEF DESCRIPTION OF THE DRAWINGS

FIG. 1 is a cross section view of a device embodying the invention inserted through a bag of growing medium and into the soil below.

FIG. 2 is a perspective view of a device of one embodiment of the present invention FIG. 3 is a perspective view of a device of another embodiment of the present invention.

FIG. 4 is a cross section view of a plant grown with the system and method of the present invention.

FIG. 6 is a perspective view of a system and method of the present invention in conjunction with an optional watering system and method.

FIG. 7 is cross section view of a tool that may be used with the present invention.

DETAILED DESCRIPTION OF THE INVENTION

Figures 5A, 5B:
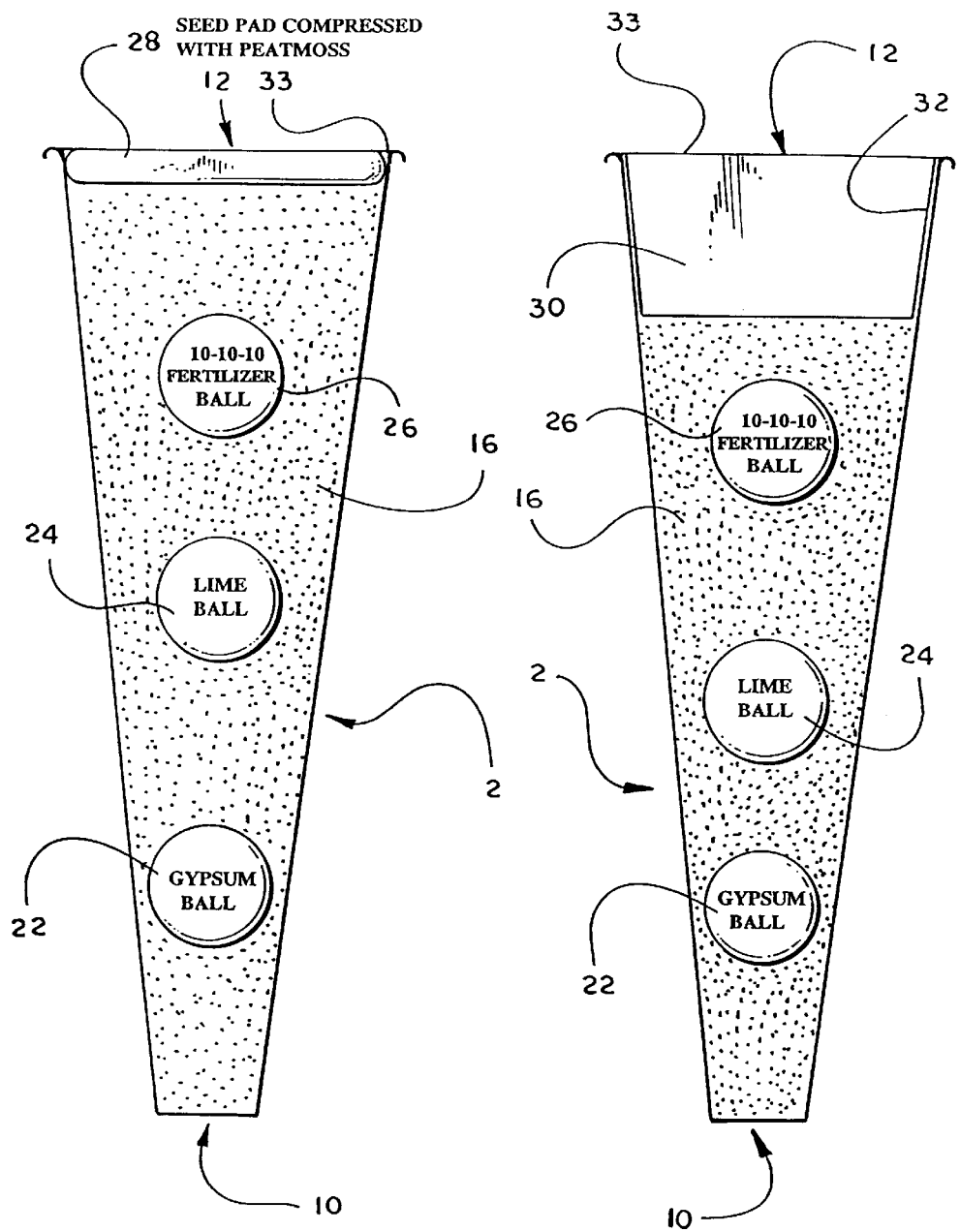
FIG. 5a is a cross section view of a device containing a planting element, growing medium and optional growth promoting substances in accordance with preferred embodiments.
FIG. 5b is a cross section view of a similar device having a space reserved for a seedling or other planting element.

The present invention includes a device, a system and a method for promoting growth of desired plants. A drawing illustrating an embodiment of a device and an accompanying system and method of the present invention is shown in FIG. 1. The method and system of the present invention utilize a novel device 2 that may be referred to as a "planting peg." Generally, the planting peg is a device for promoting growth of a planting element such as a seed, seedling, cutting, tuber or other plant generating material positioned within the device while discouraging growth of weeds and other undesirable plants. The device 2 is generally a conduit for containing and inserting plant generating material, growing medium and optional growth promoting substances into a container such as a bag 4 containing growing medium 5 placed on soil 6 or other growing medium below the bag 4 containing the growing medium 5. The device promotes root growth of a plant contained within the device 2 into the growing medium 5 contained in the bag 4 into which the device 2 has been inserted, as well as into the soil 6 or growing medium below the bag 4. The device 2 also provides a plant access to water and to nutrients from both the growing medium 5 contained within the bag 4 and the soil 6 or other growing medium located below the bag 4.

The device, system and method of the present invention provide many advantages over conventional devices, systems and methods for gardening. Generally, the device, system and method of the present invention maximize the production of fruits, vegetables and flowers form plants grown by the use of the device system and method of the present invention. Additionally, the method of the present invention saves time and money. The device, system and method of the present invention decrease and in most instances eliminate the need for tilling, weeding, and grading by allowing a practitioner of the invention to grow plants in bags of growing media placed directly on the bare, unmodified earth. The system and method of the present invention can be practiced with conventional bags of growing medium placed directly over weeds and uneven ground with no or minimal surface preparation. Because bags of growing medium can be purchased in sizes of twenty pounds and less, the average person can purchase and place such bags in a desired location. In one embodiment, plants can be grown on a hillside without concern for erosion by placing bags of growing medium up a hillside and anchoring the bags with devices of sufficient length to pin and stabilize the bags to the hillside.

A distinct advantage of the method of the present invention is that it can be practice by anyone, including first-time gardeners. Another distinct advantage of the present invention is that the invention allows young roots to become established in the supplemental growing medium contained within the bag until other roots, including the taproot, can extend into the underlying soil or other growing medium. Other potential advantages include: encouraging deeper tap root growth, supplementing existing soil without concern for erosion or the need to spread and till the supplement, allowing a plant to obtain moisture and nutrients from both a bag and the earth below, reducing soil erosion, and reducing weed growth. In one desirable embodiment, the device also contains optional growth promoting substances such as fertilizers an soil conditioners and modifiers and, thus, supplies nutrients in desired amounts and at desired locations within the device to encourage steady plant growth. Additionally, the use of growing medium contained in bags in conjunction with the device of the present invention decreases the need for watering. Thus, plants grown in accordance with the present invention may be watered by a soaker hose or other watering means, including a container with pores or other orifices that has been inserted into the bag or growing medium and that is periodically filled with water. A watering container is illustrated in FIG. 1 and is also described below.

The system and method of growing a plant by inserting a device of the present invention in a bag of growing medium are described below in conjunction with a description of the device. Additionally, a second device, a tool, that may be used to penetrate and prepare a hole in a bag of growing medium and any soil or growing medium below the bag is also described below and is illustrated in FIG. 7.

Generally, the device is designed to position a planting element in a growing medium. A planting element is any material capable of generating a plant including but not limited to, cuttings, seeds, seedlings, tubers, and bulbs. The device may be used to insert a planting element into a growing medium or a tool may be used to prepare a hole in the growing medium and the device and planting element inserted into the hole. The device may be used to place and hold the planting element at the proper depth in a growing medium. In one embodiment, the device is supplied with a particular planting element located at the proper depth for that particular planting element. Thus, a gardener can easily plant the planting element at the proper depth by inserting the device at a depth indicated on the device or provided in instructions or other literature.

Desirably, the device acts as a conduit and is designed to promote the growth of a plant element. Thus, the device should have an orifice at its upper end 12 to allow upward growth of a planting element and to provide access for watering the planting element. The device should also have an orifice proximate its lower end 10 for promoting drainage and downward root growth of the planting element. Desirably, the device also has a plurality of orifices 8 distributed over the surface of the device 14 between the orifices at ends 10 and 12 to facilitate lateral growth of the roots. The orifices may be distributed uniformly or randomly over the surface of the device and may be or various shapes and sizes. The distribution, shape and size of the orifices may be modified to cater to the needs of a particular plant. In the exemplary embodiment illustrated in FIG. 2, the device 2 has a generally elongate, conical shape to facilitate insertion of the device into.a bag of growing medium. The embodiment of the device illustrated in FIG. 2 has orifices 8 which are vertical slots distributed radially over the surface 14 of the device, with each slot extending from a position communicating with growing medium 5 contained in bag 4 to a position below the bag. In an alternate embodiment illustrated in FIG. 3, an alternate device 2' with an alternate shape is shown. The shape of device 2' can be described as two tubes of differing diameters joined coaxially where tube of the larger diameter comprises the upper portion of the device 2' and the tube of the smaller diameter comprises the lower portion of the device 2'. This embodiment also illustrates an alternate orifice shape and distribution. The surface orifices 8 in the embodiment of FIG. 3 are circular holes distributed over the surface 14 of the upper portion of the device.

Because the device may be of various shapes, lengths, and sizes and may comprise various configurations of orifices and/or sizes of orifices, the device may be constructed to accommodate the needs of a particular plant. For example, bulbs require devices of larger circumferences in order to contain a bulb. It would be desirable to provide plants requiring extensive root systems devices with a greater amount and/or size of orifices in order to accommodate greater root growth. The orifices at surface 14 and end 10 may be distributed and sized depending on whether the plant propagates shallow or deep roots or some combination of both.

The device may be made of various materials including, but not limited to, plastics, foams and paper. Suggested plastics include thermoplastics such as polyethylene, polypropylene and polyvinyl chloride. Advantageously, when the device is made of a non-degradable material such as the aforementioned plastics, the device retains its strength and can be used to facilitate harvesting and removal of a plant contained within the device. However, the device may be made of degradable material depending if desired. Degradable materials, include but are not limited to, paper and cardboard.

Referring to FIG. 4, a gardener can easily remove a plant for harvest by grasping the base of the plant 20 and/or a portion 18 of the device that is exposed above the surface of the bag 5 and lifting the device and plant upward. The desired portions of the plant, e.g. fruit, may then be harvested and the device and the plant disposed of or replanted. Alternatively, a new device and a new planting element may be inserted in the void left by the harvested device and plant. In order to further facilitate harvesting and removal, the device may include grasping means proximate the second end. Such grasping means include, but are not limited to, an integral lip 13 illustrated in FIG. 3, a flange, ridges, projections, one or more handles, etc. The grasping means should be located close enough to the second end 12 of the device 2 or 2' so that the grasping means is above the surface of the bag 5 when inserted and is easily located when removal of the device from the ground is desired.

Additionally, if the device is constructed of non-degradable material, the device may be reused. To reuse the device, a gardener merely removes the old plant from the device by pulling and cutting the plant and its roots from the device and then refills the device with a new planting element and optional planting medium and growth promoting substances. In an environmentally conscious embodiment, the device is made of recycled material. For instance, the device may be constructed from a used lawn sprinkler housing. In this embodiment, the ends of the housing should be opened or removed and slots or holes should be cut from the surface of the housing to provide access for roots and increased drainage and access to nutrients.

The device may be supplied to consumers containing optional growing medium 16 and various substances beneficial to the growth and development of various plants. As used herein, such substances are generally referred to as "growth-promoting substances." Growth-promoting substances can be any substances or compositions beneficial to the growth of a plant and include, but are not limited to: peat, humus, soil, vermiculite, soil conditioners, soil modifiers, minerals, fertilizers, nutrients, germinating aids, rooting aids, hormones, weed killers, weed inhibitors, fungicides, larvacides, insecticides, insect repellants, animal repellants and any other substances thought to be beneficial to the growth of various plants. Specific examples of growth promoting substances are described in U.S. Pat. No. 5,022,182 which is incorporated herein by reference in its entirety. The growth promoting substances, a planting element and any planting medium may be placed inside the device prior to or after insertion of the device into a bag of growing medium. Thus, a device of the present invention may be supplied to consumers with or without a planting element, growing medium or growth promoting medium contained therein. The devices may be labeled, tagged or colored coded to indicate the type of planting element, growth promoting substances and growing medium that is contained or intended to be contained within the device.

The growth promoting substance and any combination of growth promoting substances may be tailored to meet the specific needs of a desired plant. Further, the growth promoting substance may be tailored to the specific climate and geographical location in which the method of the present invention is practiced. For example, in the state of Georgia and other locations where the clay content of the native soil is higher than desirable for particular planting elements, it is desirable to include gypsum as a growth promoting substance in the device. If the acidity of the underlying soil or the growing medium contained within the bag is higher than desirable for a particular planting element, it is desirable to include lime or another basic substance as a growth promoting substance in the device to raise the pH of the soil to levels beneficial to the particular planting element.

The device 2 may contain growing medium 16 and several growth promoting substances, such as pellets of fertilizer, soil modifiers and pH modifiers or balancers. The growth promoting substances may be included in the device in forms and shapes other than illustrated, including lumps, timed-release capsules, powders and liquids. When the device contains growing medium and the growth promoting substances are provided in solid form, the sequence and depth of the growth promoting substances can be varied to accommodate the needs of a particular planting element and a particular environment. In the exemplary embodiments illustrated in FIG. 5, the devices are provided with the following components: a gypsum pellet 22 is provided in the lower portion of the device, followed by growing medium, a pellet of lime 24, growing medium and a fertilizer pellet or capsule. The thus prefilled devices may be supplied to consumers with a planting element contained therein, such as a seed pad 28, as illustrated in FIG. 5a. Or, prefilled devices may be supplied without a planting element allowing the customer to select and insert a planting element into the prefilled device. A prefilled device without a planting element is illustrated in FIG. 5b. In this embodiment, a space 30 is reserved in the device for a planting element such as a seedling from a planting tray. The space may be protected with an insert 32 such as a paper cup. Preferably, the prefilled device is protected by enclosing upper end with a paper or plastic film cover 33 until ready for use. The lower end may also be protected with a paper or plastic film cover. To use the prefilled device in FIG. 5a, a gardener merely needs to remove any protective film or paper and then insert the prefilled device into a bag of growing medium. To use a prefilled device as illustrated in FIG. 5b, a gardener first removes any protective film or paper and places a seedling or other planting element in the space reserved at the top of the device. The device may be inserted into a bag of growing medium either before of after the seedling or other planting element is placed in the device.

Another suggested organic growth promoting substance mix is described below. The suggested organic mix includes sources of nitrogen that may be substituted in place of fertilizer in the combination described above. Organic sources of nitrogen include, but are not limited to, bat guano, blood meal and soybean meal. Sources of phosphorous can be substituted for the lime. Organic sources of phosphorous include bone meal, colloidal phosphorous and rock phosphate. And, sources potassium may be substituted for the gypsum pellet. Sources of potassium include, but are not limited to, granite dust, green sand and ground kelp. These substitutions provide a device filled with organic growth promoting substances that are particularly desirable to organic gardeners and others.

In the method of the present invention, device 2 is inserted into a bag of growing medium so that the lower end of the device penetrates through first the top and then the bottom of a bag of growing medium and then breaks the surface 32 of soil or other growing medium below the bag and the top portion of the device is at the top surface of the bag (illustrated in FIG. 1) or above the top surface 5 off bag 4 (illustrated in FIG. 4). The method is also illustrated in FIG. 6. In FIG. 6, several bags 4 of growing medium are placed on the bare ground 6 and devices 2 are inserted into the bags and the ground below the bags. The bags are positioned adjacent to one another to control weed growth over an extended area of the underlying soil. It should be noted that one or more devices may be inserted in one bag of growing medium and that the number of devices that may be inserted into a bag of growing medium is determined by the size of the bag, the needs of the plants 34 and the desires of the gardener practicing the method of the invention.

Watering methods and devices are illustrated in FIG. 1 and FIG. 6. In FIG. 6, a soaker hose 36 is utilized to provide water to the plants 34. Other watering devices and means may be used with the present invention. Or, water may be provided to the planting elements by natural means such as rain and dew. One watering device utilized in an exemplary embodiment is illustrated in FIG. 1. The water device in FIG. 1 is a container 50 that can be inserted in a bag 4 of growing medium 5, desirably through the top surface but not the bottom surface of the bag. The container 50 has one or more small holes 52 located on the portion of the container below the top surface of the bag of growing medium. When the container is filled with water 54, the water leaks slowly into the growing medium 5 contained in the bag 4 and provides plants with a water source.

In the method of the invention, a planting peg is inserted into a bag containing growing medium so that the peg penetrates both sides of the growing medium and breaks the surface of the ground or a second bag of growing medium underlying the first bag. Thus, a plant growing in the peg may obtain water and nutrients from both the bag of growing medium and the underlying soil or other growing medium located below the first bag of growing medium. Any bag of growing medium can be used with the system and method of the present invention, including, but not limited to, the bags described in U.S. Pat. Nos. 4,299,056, 5,022,182, 5,081,791 and 5,241,783, so long as penetrations can be made in the sides of the bag of growing medium and a device is inserted through the penetrations in the bag. Conventional bags and types of growing medium are also amenable to use with the system and method of the present invention and are available at most garden and hardware stores. Bags of growing medium include, but are not limited to, bags of manure, compost, topsoil, mulch, vermiculite, etc. Plastic bags containing growing medium provide a good barrier against weed growth. However, the growing medium may be contained in other containers that can be penetrated by a device 2 or a tool. Other containers include, but are not limited to, bags and boxes made of foam or paper. Most commercially available bags of growing medium are about six inches thick. Thus, a planting peg used with such conventional bags of growing medium should be at least six inches long.

The type of growing media contained within the bag and the planting peg can be selected to accommodate a particular planting element, environment, and to supplement the existing soil. One suggested growing medium is a mixture of 60 percent by weight humus, 20 percent by weight peat moss, 10 percent by weight sand, 5 percent by weight 10-10-10 fertilizer and 0 to 5 percent by weight of gypsum and lime depending on the clay content and acidity of the soil, respectively. Another suggested growing medium that contains only organic matter is a mixture of 70 percent by weight compost, 10 percent by weight cow manure, 10 percent by weight chicken manure, and 5 percent by sand. These two suggested growing media are desirable as the growing medium to be contained within the device and may be The planting peg may be constructed so that the peg is rigid enough to be used to puncture one side of the bag, penetrate the growing medium contained within the bag, puncture the other side of the bag and break the surface of the ground located beneath the bag. Desirably, the peg has a first end that is smaller in profile than the second end in order to facilitate insertion of the device in the bag of growing medium and the ground below. More desirably, the peg is tapered. A tapered planting peg is illustrated in FIG. 2. If desired, a solid point may be provided at the bottom or the peg to improve penetration. In this case, an opening for a taproot may be provided above the solid point.

Alternatively, a tool can be used to puncture the bag containing the growing medium and to break the surface of the soil located beneath the bag. The device may then be placed in the void made by the tool. One tool that may be used for this purpose is illustrated in FIG. 7. Generally, the tool is a pointed device with a profile similar to the profile of the peg and is made of a strong material such as steel. The tool should have a handle 42 to facilitate handling and removal. Desirably, the tool has a striking surface 44 for striking the tool with a hammer, foot or other object to drive the tool into a bag of growing medium and make an impression in the growing medium below. The tool is then removed, leaving a void into which a peg may be inserted.

It is to be understood that the above examples are illustrative embodiments and that the present invention is not to be limited by any of the examples or details in the description. Rather, the claims appended hereto are to be construed broadly within the scope and spirit of the present invention.

What is claimed is:

1. A planting device comprising:
    a conduit generally tapering from a relatively smaller first end to a relatively larger second end;
    the conduit defining a length between the first end and the second end greater than six inches;
    the conduit being constructed of a rigid, non-degradable material of sufficient strength to penetrate into and through a bag containing a first growing medium and into a second growing medium adjacent to the first growing medium;

the conduit defining between the first and second ends a plurality of orifices of size sufficient to allow root growth therethrough;

the conduit containing one or more growth promoting substances; and a planting element positioned within the conduit.

2. The planting device of claim 1, wherein the conduit is constructed of plastic.

3. The planting device of claim 1, wherein the growth promoting substances include a fertilizer and a soil conditioner.

4. The planting device of claim 3, wherein the planting element comprises a seed pad in contact with the growth promoting substances at the second end of the conduit.

5. The planting device of claim 3, wherein the planting element comprises a seedling in contact with the growth promoting substances at the second end of the conduit.

6. The planting device of claim 3, wherein the planting element comprises a bulb in contact with the growth promoting substances at the second end of the conduit.

7. The planting device of claim 3, wherein the planting element comprises a tuber in contact with the growth promoting substances at the second end of the conduit.

8. The planting device of claim 3, wherein the planting element comprises a cutting in contact with the growth promoting substances at the second end of the conduit.

9. The planting device of claim 1, further comprising a solid point at th e first end of the conduit.

10. A weed controlling planting system comprising:

a plurality of bags of first growing medium arrayed adjacent to one another to cover an area;

one or more planting devices inserted into the bags, the planting devices comprising:

a conduit generally tapering from a relatively smaller first end to a relatively larger second end;

the conduit being constructed of a rigid, non-degradable material of sufficient strength to penetrate the bag containing the first growing medium;

the conduit defining between the first and second ends a plurality of orifices of size sufficient to allow root growth therethrough;

the conduit containing one or more growth promoting substances; and a planting element positioned within the conduit.

* * * * *